Jan. 21, 1964  J. BENZ  3,118,268
LAWN MOWER AND ATTACHMENT THEREFOR
Filed Sept. 16, 1960

INVENTOR.
JOSEF BENZ
BY

ATTORNEYS

United States Patent Office 3,118,268
Patented Jan. 21, 1964

3,118,268
LAWN MOWER AND ATTACHMENT THEREFOR
Josef Benz, 13 Parkview Terrace, Rochester, N.Y., assignor, by direct and mesne assignments, of ten percent to Winslow E. Thomson, ten percent to Theodore B. Roessel, and five percent to John R. Schovee
Filed Sept. 16, 1960, Ser. No. 56,411
1 Claim. (Cl. 56—255)

This invention relates to lawn mowers and attachments therefor and, more particularly, to power driven lawn mowers of the rotary type, one object being the provision of a more satisfactory lawn mower of this description.

Rotary lawn mowers generally consist of a frame member, carrying a rotatable cutting blade and means for driving the same, supported by wheels for allowing the machine to be moved across the surface of the grass to be cut. The cutting blade is generally supported for rotation about a substantially vertical axis so that the blades move in a substantially horizontal plane for producing a level cut.

In known lawn mowers of the above description, the blades are mounted for rotation in a horizontal plane with respect to the frame member. When the surface of the lawn being cut is not level, the plane of the blade is often tilted to the detriment of the cutting action. For example, should the supporting wheels inadvertently encounter a depression, tilting the frame and causing the rapidly rotating blade to dig into the ground with the attendant "scalping" effect and danger of injury to the blades. These dangers are inherent in any of the known lawn mowers which are supported by spaced wheels because of the inability of such wheels to respond to changes in terrain, obstacles, and the like which are not directly in their line of travel. For this reason, a provision of means for sensing irregularities in the ground, obstacles, or other objects that might interfere with the rotating blade, but which may not be in line with the travel of the wheels, is another object of this invention.

It has been found that if the mower were supported by rollers extending substantially across the entire frontal area of the mower, that any obstacle extending in the path of the blade would be sensed by the rollers which would tilt the front end of the mower upwardly prior to passing over the obstacle and cause the blade to clear this obstacle. However, the friction involved in driving rollers across the ground makes the use of such roller support impractical because of the excessive power required to move the mower. For this reason, the provision of rollers which are slightly elevated above the ground and which come into play only when an obstacle is encountered is another object of this invention.

A further shortcoming of known lawn mowers of this nature is encountered when it is desired to trim the grass in close proximity to the edges of flower beds, walks and other places where at a level lower than that of the surface of the lawn being cut. For example, where flower bed is being trimmed, the wheels of the mower on the side adjacent to the bed will fall into the flower bed causing the mower to tilt, bringing the blade into contact with the earth at the edge of the flower bed causing the blades to dig in. It has been found that this effect can be overcome by the provision of auxiliary supporting means, such as rollers, which will contact the ground when the wheels on one side of the mower fall into a depression, preventing excessive tilting of the mower and the intended digging in of the blades to the ground. The provision of such a means is another object of this invention.

A further object of this invention is the provision of auxiliary roller supporting means which are adjustable in height so that the position wherein they come into supporting contact with an obstruction, may be controlled.

A further object is the provision of auxiliary supporting rollers which may be attached to lawn mowers of known design in order to afford the advantages of this particular type of construction.

Other objects and advantages of this invention will be particularly set forth in the claim and will be apparent from the following description, when taken in connection with the accompanying drawings, in which:

Figure 1:
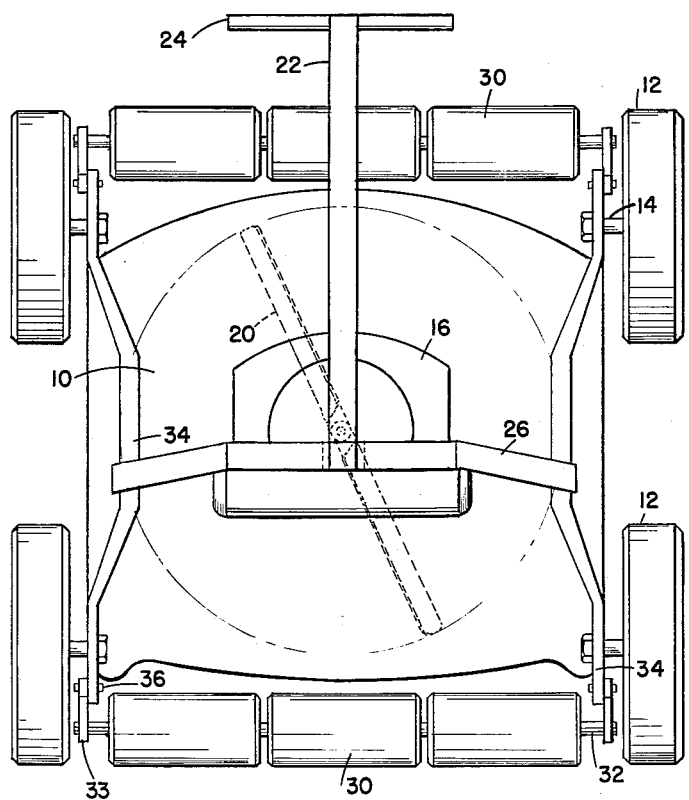
FIG. 1 is a top plan view of a lawn mower embodying this invention.

The lawn mower comprising this invention herewith disclosed for purposes of illustration preferably consists of a body portion of frame 10 which may be of the known skirted construction, which may be cast or formed in any other desired manner. Frame 10 is preferably supported by four spaced wheels 12 rotating on parallel, transverse axles 14.

Body or frame portion 10 supports a gasoline engine or other source of power 16. Engine 16 is provided with a downwardly extending shaft 18 carrying horizontally extending cutter blade 20. Body portion 10 is also provided with an upwardly and rearwardly extending handle 22 terminating in a grip 24 and attached to the body portion 10 by means of a bail 26. Handle 20 is used for propelling and guiding the lawn mower in the known manner.

The above description is of the conventional gasoline-powered, rotary, hand-propelled lawn mower, well known in the art, which forms no part of this invention. It is to be understood that any of the known rotary lawn mowers will suffice for the purposes of this invention, whatever the form of its propulsion, wheel arrangement, blade arrangement, or means used for driving the blade. The above description has been held to a minimum for purposes of simplicity since the general configuration and mode of operaiton of power driven rotary lawn mowers is well known in the art.

It is well known that when rotary lawn mowers of the above general description are propelled across a smooth flat lawn, they produce an even level cut giving a desired neat appearance to the finished lawn. However, it also has been found that in order to produce a finished mowing job, it is necessary to trim the grass close to the borders of flower beds, walks and other similar places bordering the lawn. The grass at such places tends not only to grow vertically, but to lean out over the border of the flower beds, so that in order to produce a smooth finished mowing job it has heretofore been necessary to trim the edges by hand or by use of machinery specially adapted to this purpose.

It is contemplated in this invention that the mower which is used for cutting the body of the lawn also will be suitable for trimming the grass closely adjacent to the borders of flower beds. In order to accomplish this, it is necessary that the blades pass vertically over not only the extreme edge of the border of the flower bed, but also inwardly thereof in order to cut the portion of the grass which extends inwardly over the border. However, in order to do this, the rotating blade must pass over the border of the flower bed itself.

In the conventional lawn mowers such as I have described above, at least one of the wheels 12 on each side of the mower must be supported by solid ground in order to maintain cutting blade 20 in a substantially horizontal plane. When it is desired to mow the grass adjacent to a border, both wheels on one side of the mower fall into the trough forming the border, allowing the mower to tilt. When this occurs, the blade 20 which heretofore has been supported in a substantially horizontal position is similarly tilted. If the blade is sufficiently close to the ground and the border is of substantial depth, the tilt of the lawn mower causes the blade on the side adjacent to the border to bite into the ground, cutting not only the top of the grass as desired, but actually slicing off and removing a thin layer of earth and grass adjacent to the border. This condition, popularly known as "scalping," is extremely harmful not only to the appearance of the lawn being mowed but may seriously injure the lawn mower, the cutting blade, and is also dangerous to the operator. In the first place, when the blade bites into the earth removing a layer thereof as described above, the blade is normally seriously dulled, thereby imparing the efficiency of the mower. Further, should a stone or other hard object be in the ground at the point where the "scalping" occurs, the blade may actually be chipped, or in certain cases shattered, and pieces of this broken blade which is revolving at high velocity may be thrown out by contrifugal force with great force thereby presenting a considerable danger to the lawn mower operator and other persons who may be in the vicinity. Moreover, small stones which may be in the path of the blade may be similarly thrown, presenting similar danger. It is, therefore, desirable to prevent this tilting of the lawn mower when the wheels on one side thereof are unsupported when mowing adjacent to a border. This invention contemplates a means of preventing this undesirable phenomenon.

In order to prevent this "scalping" effect, rollers 30 are mounted on transversely extending axle 32 rotatably mounted on links 33 which are carried by forwardly and rearwardly extending brackets 34 which are mounted on frame portion 10. Links 33 are preferably pivotally mounted by means of bolts 36 in order to allow rollers 30 to be adjusted upwardly and downwardly in a vertical plane for purposes hereafter to be described.

Rollers 30 extend transversely of the mower, and preferably cover the swath cut by rotating blade 20 so that any obstruction which will be encountered by cutters 20 mowing in either direction will first be encountered by rollers 30 which will serve to lift the mower upwardly to allow the blade 20 to clear the same.

When the mower, equipped with rollers as described above, is used to cut the grass at the edge of a border, the wheels 12 on one side are unsupported because of the trough comprising the border, and the lawn mower begins to tilt. At this point, rollers 30 contact the ground on both the front and the rear of the mower as clearly shown in FIG. 2. This limits the tilting of the mower thereby preventing blade 20 from contacting the ground and prevents the undesirable "scalping" effect described above.

In practice, it is contemplated that roller 30 be adjusted vertically to a height somewhat above the ground but below the plane of cutting blades 20. It is desirable that the rollers be somewhat above the ground so that, in normal use when the mower is used on flat lawn, the rollers will not contact the ground. This is desirable since it has been found that it requires considerably more effort to push a mower supported by rollers on rollers than a mower riding on its wheels alone. Thus, by keeping the rollers at an elevation normally out of contact with the ground, no undue effort is required to drive the mower during normal operation on a flat lawn. However, by maintaining the rollers at a position below the plane of the revolving blade, the rollers will come into contact with the ground before the mower can tilt sufficiently to allow the blade itself to come into contact with the ground.

Figure 2:
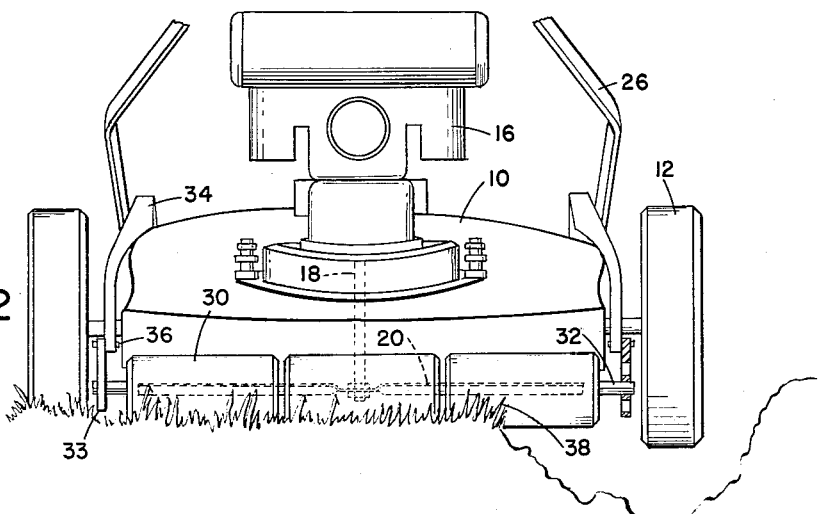
FIG. 2 is a fragmentary front elevational view of the lawn mower of FIG. 1 with certain parts shown in section.

The effect of this invention may be seen from an examination of FIG. 2. This figure shows how the mower can be operated with one wheel on one side totally unsupported. However, the rollers effectively prevent the mower from tilting more than a few degrees from its normal horizontal plane of operation. At the same time, the mower can be operated so that the cutter can pass over the blades of grass 38 growing at the extreme edge of the lawn and extending outwardly over the border. Such grass heretofore normally had to be trimmed by hand in order to preserve the neat appearance of the border of the lawn.

It is evident from the above description that any type of rotary lawn mower whether hand or power propelled, can be equipped with the adjustable rollers comprising this invention. The provision of the rollers extending across the path of the blade completely protects the blade not only from obstructions or hillocks which may be in front of the lawn mower but also from tilting which occurs should the wheels on side of the lawn mower become unsupported. It greatly extends the usefulness of the conventional lawn mower in allowing it to be used for rapidly and automatically trimming the edges of the borders of flower beds and the like, while at the same time greatly increasing the safety of such lawn mowers by effectively preventing the injurious effects of "scalping," consequent breakage of blades and other undesirable circumstances.

It is also to be understood that while this invention has been described in connection with a rotary mower, it is equally applicable to mowers of other types. Moreover, it may be applied to existing mowers or new mowers specifically designed for the purpose. In the case of existing mowers, the rollers, supporting brackets, and associated parts may be supplied as an attachment which may be fastened in position my any suitable means. In the case of new mowers, the rollers comprising this invention may be furnished as an integral part of a mower. In this case, brackets 34 may be formed as an integral part of the body of the mower.

While I have shown and described the preferred form of mechanism of my invention it will be apparent that various modifications and changes may be made therein, particularly in the form and relation of parts, without departing from the spirit of my invention as set forth in the appended claim.

I claim:

An improvement in a lawn mower having cutting means rotating in a horizontal plane and a plurality of spaced wheels on opposite sides of said cutting means for supporting said cutting means in proper cutting spaced relationship with the ground, comprising roller means extending substantially the full width of the cutting path of the cutter means mounted in front of and in back of said cutting means; said roller means having a ground engaging plane being spaced vertically above the ground engaging plane of said wheels and below the cutting plane of said cutting means.

References Cited in the file of this patent

UNITED STATES PATENTS

| | | |
|---|---|---|
| 1,880,154 | Rotondo et al. | Sept. 27, 1932 |
| 2,071,872 | Cockburn | Feb. 23, 1937 |
| 2,114,096 | Noel | Apr. 12, 1938 |
| 2,485,312 | Powell | Oct. 18, 1949 |
| 2,737,771 | Holtz | Mar. 13, 1956 |

FOREIGN PATENTS

| | | |
|---|---|---|
| 845,169 | Great Britain | Aug. 17, 1960 |